Figure 1:
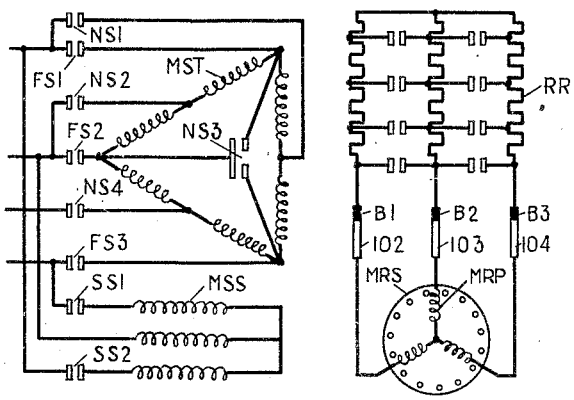

April 22, 1947.   J. D. LEWIS   2,419,268
PLURAL POLE NUMBER INDUCTION MOTOR
Original Filed Nov. 27, 1943   2 Sheets-Sheet 1

Jacob Daniel Lewis INVENTOR
BY  ATTORNEY

Patented Apr. 22, 1947

2,419,268

UNITED STATES PATENT OFFICE 2,419,268

PLURAL POLE NUMBER INDUCTION MOTOR

Jacob Daniel Lewis, Yonkers, N. Y., assignor to Otis Elevator Company, New York, N. Y., a corporation of New Jersey Original application November 27, 1943, Serial No. 512,023. Divided and this application December 7, 1944, Serial No. 567,086

7 Claims. (Cl. 172—274)

The invention relates to electric motors, especially for hoists.

This application is a division of application Serial Number 512,023 of Jacob Daniel Lewis, filed November 27, 1943.

It is desirable in certain types of hoisting installations such as cargo winches that the hoisting motor may be operated at different speeds. There are certain advantages in utilizing polyphase alternating current motors as hoisting motors, especially for installations of this character.

One object of the invention is to provide a polyphase multi-speed induction motor especially for hoists.

The invention will be described as applied to a polyphase multi-speed induction motor especially suitable for a cargo winch hoisting motor.

In the embodiment illustrated, the motor is provided with three operating speeds, namely, normal speed, fast speed and slow speed. The stator of the motor is arranged to provide excitation for three different pole numbers, one for normal speed, a second for fast speed and the remaining for slow speed. This is effected by providing two windings on the stator, one for a high number of poles for slow speed operation and the other arranged to provide either a number of poles for normal speed operation or a lower number of poles for fast speed operation. The rotor is provided with two windings, one a definite pitch squirrel cage winding and the other phase wound. The latter winding is wound for the number of poles of stator excitation for normal speed. It is connected through slip rings to rotor resistance which may be varied to control the torque of the motor. The pitch of the squirrel cage winding is such that it serves as the rotor winding for both fast speed stator excitation and slow speed stator excitation. The number of poles or stator excitation are so correlated that zero or negligible current flows in the phase wound rotor winding during excitation for either fast or slow speed operation and zero or negligible current flows in the squirrel cage winding during excitation for normal speed operation.

Features and advantages of the invention will be seen from the above statements and from the following specification and appended claims.

Figure 2:
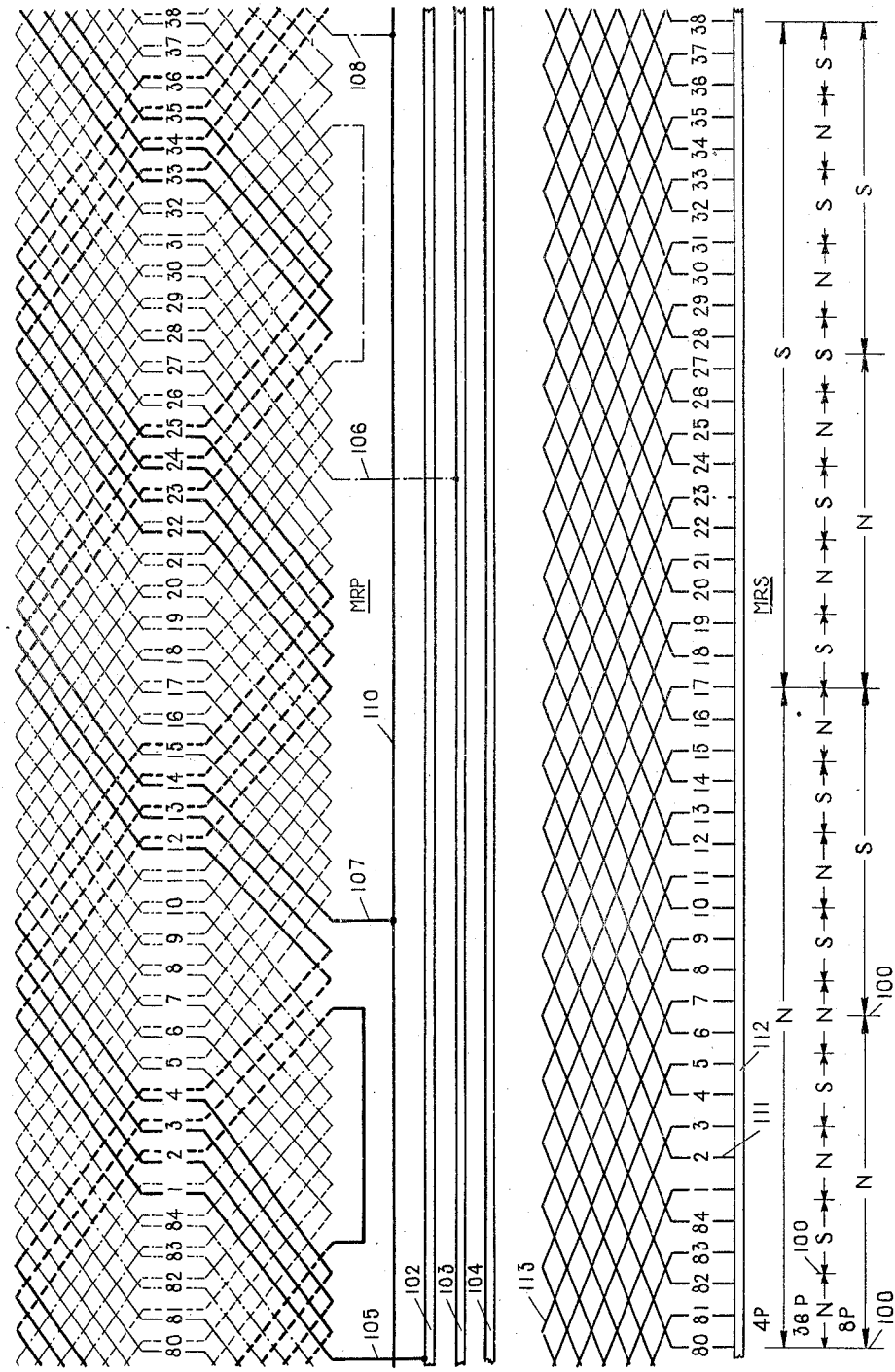

In the drawings:

Figure 1 is a schematic wiring diagram of the windings of a polyphase multi-speed induction motor embodying the invention; and Figure 2 is a developed diagram, for half the circumference of the rotor, of the rotor windings of the motor of Figure 1.

Referring first to Figure 1, the motor illustrated is a three speed, three phase induction motor. These different speeds are obtained by exciting the stator to provide different numbers of field poles. This is effected by means of two stator windings, one a two speed winding designated MST for providing excitation for normal speed operation when contacts NS1, NS2, NS3 and NS4 are closed and for fast speed operation when contacts FS1, FS2 and FS3 are closed, and the other a single speed winding designated MSS for providing excitation for slow speed operation when contacts SS1 and SS2 are closed. The rotor is provided with a phase wound winding designated MRP and a squirrel cage winding designated MRS. The phase wound winding is connected through slip rings 102, 103 and 104 and brushes B1, B2 and B3 to star connected rotor resistance RR.

Referring to Figure 2, an embodiment of the invention will be described in which the motor operates as an eight pole motor to provide normal operating speed, as a four pole motor to provide fast operating speed and a thirty-six pole motor to provide slow operating speed. The phase wound winding is shown at the top of Figure 2 and the squirrel cage winding is shown below the phase wound winding, only half of each winding being shown. The stator poles under the different conditions of excitation are indicated at the bottom of the figure. N designates north poles while S designates south poles. The poles for the different pole numbers are represented by the spaces between the short vertical lines 100. The poles for the different excitations are indicated in three rows, the upper of which is for four pole excitation and is designated 4P, the middle of which is for thirty-six pole excitation and is designated 36P and the lower of which is for eight pole excitation and is designated 8P.

The phase wound winding of the rotor is an eight pole three phase winding illustrated as arranged in eighty-four slots, distributed in three and four slots per phase per pole. The slots are designated by numbers, namely, 1, 2, 3, etc. The phase windings are differentiated by heavy, light and dot-dash lines. Each phase winding is a wave winding of substantially full pitch, the sides of the coils being spaced ten and eleven slots. Each slot contains the conductor forming one side of one coil and the conductor forming the other side of another, the two conductors per slot being arranged one on top of the other to form a double layer winding. The phase windings are respectively connected to slip rings 102, 103 and 104 by leads 105, 106 and a lead not shown owing to the fact that only half the rotor winding is illustrated. At their other ends the phase windings are star connected as indicated by the leads 107 and 108 connected to wire 110, the lead connecting the other phase winding not being shown because of only half the rotor winding being illustrated. This phase wound winding of the rotor serves during operation of the motor on eight pole excitation.

The bars or conductors 111 of the squirrel cage winding are arranged in the same slots as the conductors of the phase wound winding, the slots being designated as above by the numbers 1, 2, 3, etc. There is one conductor per slot for the squirrel cage winding, making with the phase wound conductors a total of three conductors per slot. The squirrel cage conductors are positioned in the slots on the outside of the phase wound conductors. At one end of the rotor the squirrel cage conductors are joined to an end ring 112. At the other end of the rotor, conductors spaced twenty-one slots are connected in pairs by end connectors 113 to provide a definite pitch winding. In order to form the conductors and their end connectors as units and to provide one conductor per slot, like sides of these units are positioned in alternate slots.

The squirrel cage winding of the rotor serves during operation of the motor both on four pole and thirty-six pole excitation. By forming the coils as units, in which the conductors have end connectors with the connected conductors spaced twenty-one slots or one quarter the circumference of the rotor, with four pole excitation, i. e., a total of 720 electrical degrees, these conductors are spaced 180 electrical degrees to provide a full pitch winding. This may also be seen by tracing the circuits through the conductors under the four pole excitation indicated at the bottom of the sheet. Taking the conductor in slot 2 for example, it will be seen that at the instant of excitation indicated, it is under a north pole, whereas the conductor in slot 23 to which it is joined is at a corresponding point under a south pole. Similarly, the conductors of any other connected pair have corresponding positions under opposite poles. With thirty-six pole excitation, the stator has 6480 electrical degrees so that the connected conductors are spaced 1620 electrical degrees which is the equivalent of 180 electrical degrees. Thus again, a full pitch winding is provided. This may also be seen by tracing the circuits through the conductors under the indicated thirty-six pole excitation. Taking again the conductor in slot 2, it is under a north pole whereas the conductor in slot 23 is at a corresponding point under a south pole. Likewise, the conductors of any other connected pair have corresponding positions under opposite poles. Thus, under both four pole and thirty-six pole excitations, the voltages induced in the connected conductors act cumulatively. This arrangement of connections also results in a low resistance path through the end ring under thirty-six pole excitation, whereas under four pole excitation the resistance of the end ring is high.

Inasmuch as the connected conductors of the squirrel cage winding are spaced one quarter the circumference of the rotor, they are spaced 360 electrical degrees with eight pole excitation. This may also be seen by tracing the circuits through the conductors under the eight pole excitation. Taking again the conductors in slots 2 and 23, these conductors are at corresponding points under north poles. Likewise, the conductors of any other connected pair have corresponding positions under like poles. Inasmuch as connected conductors are under the influence of like poles the voltages induced in these conductors neutralize each other. Thus, under eight pole excitation, there is no current flow in the squirrel cage winding.

Whereas there is no current flow in the squirrel cage winding with eight pole excitation, there is likewise no current flow in the phase wound winding with four pole or thirty-six pole excitation. On four pole excitation the conductors forming sides of each coil of the phase wound winding are spaced 90 electrical degrees from each other and 180 electrical degrees from the corresponding conductors of the next succeeding coil. Consequently the voltages induced in the corresponding conductors of adjacent coils neutralize each other. This may be seen by tracing the circuits through the conductors with the four pole excitation indicated. Taking the phase (heavy line) conductor in slot 2, since this conductor and its connected (heavy line) conductor in slot 23 are spaced 180 electrical degrees and thus are at corresponding points under north and south poles respectively, and since the circuits through these conductors are in the same direction, the voltages induced in these conductors neutralize each other. The same is true of the (heavy dotted line) conductors in slots 13 and 34. Thus, as the voltages induced in the conductors in slots 23 and 34 neutralize respectively the voltages induced in the conductors in slots 2 and 13, the resultant voltage induced in these two coils is zero. This condition is duplicated for each succeeding pair of coils so that the voltage induced in the phase wound winding during four pole excitation is zero.

Similarly, under thirty-six pole excitation, as the conductors forming the sides of each coil of the phase wound winding are spaced 1620 electrical degrees, the equivalent of 180 electrical degrees, from the corresponding conductors of the next succeeding coil, the voltages induced in these conductors neutralize each other. Thus the voltages induced in succeeding coils neutralize each other so that there is no voltage induced in the phase wound winding. This may be seen by tracing the circuits through the conductors with the thirty-six pole excitation indicated. Taking again the (heavy line) conductor in slot 2 and its connected (heavy line) conductor in slot 23, these conductors are at corresponding points under north and south poles respectively, and since the circuits through these conductors are in the same direction, the voltages induced in these conductors neutralize each other. The same is true of the (heavy dotted line) conductors in slots 13 and 34. Thus, as the voltages induced in the specified conductors neutralize each other, the resultant voltage induced in the coils formed by these conductors is zero. This condition is duplicated for each succeeding pair of coils so that the voltage induced in the phase wound winding during thirty-six pole excitation is zero.

It is to be understood that the speeds of the motor are dependent upon the particular application and that the ratios of the various speeds may vary. In the arrangement of motor which has been described, variation of speed ratios may be effected by varying the ratios of pole numbers. By utilizing ratios of pole numbers such that the number of poles for slow speed excitation is an odd multiple of that for fast speed excitation but not a multiple of that for normal speed excitation and that the number of poles for normal speed excitation is an even multiple of that for fast speed excitation, the phase wound rotor winding will be effective only for normal speed excitation and the squirrel cage winding will be effective only for fast and slow speed excitations. Although in the optimum arrangement full pitch rotor windings are provided, one or both windings may be fractional in pitch so long as this does not cause objectionable current flow in the winding when operating on the excitation for the other winding. The different pole numbers of stator excitation may be obtained in ways other than that described. Motors of other numbers of phases may be employed and either star or mesh connections may be utilized. The motor may be utilized for various types of hoists and may also be used for other types of industrial applications.

Thus, as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A three-phase multi-speed induction motor comprising; a stator; windings on the stator adapted to provide excitation of a certain number of pairs of poles for fast speed operation, of a higher number of pairs of poles for medium speed operation which is an even multiple of said certain number of poles or of a number of pairs of poles for slow speed operation which is greater than but indivisible by said higher number of pairs of poles and is an odd multiple of said certain number of pairs of poles; a rotor; a winding wound on the rotor for said medium speed operation; and a definite pitch squirrel cage winding on the rotor for both said fast speed and said slow speed operation.

2. A polyphase multi-speed induction motor comprising; a stator; windings on the stator for providing excitation for three different numbers of pairs of poles; a rotor; a winding on said rotor effective during excitation for one of said numbers of pairs of poles; and a second winding on the rotor effective during excitation for either of the other of said numbers of pairs of poles.

3. A polyphase multi-speed induction motor comprising; a stator; a two-speed polyphase winding on the stator; a single speed polyphase winding on the stator; a rotor; a winding on said rotor for cooperation with said two speed winding for one operating speed; and a second winding on the rotor for cooperation with either said two speed winding for the other operating speed or with said single speed winding.

4. A polyphase multi-speed induction motor comprising; a stator; a polyphase winding on the stator adapted to be connected to provide excitation of either of two different numbers of pairs of poles; a second polyphase winding on the stator adapted to provide excitation of a third number of pairs of poles; a rotor; a winding on said rotor effective during excitation by the first named polyphase winding when connected for excitation of one pole number; and a second winding on the rotor effective during excitation by said first named polyphase winding when connected for excitation of the other pole number, or during excitation by said second polyphase winding.

5. A polyphase multi-speed induction motor comprising; a stator; a polyphase winding on the stator adapted to be connected to provide excitation of either of two different numbers of pairs of poles, one of which is an even multiple of the other; a second polyphase winding on the stator adapted to provide excitation of a higher number of pairs of poles which is an odd multiple of the lower of said different number of pairs of poles but is indivisible by the higher of said different number of pairs of poles; a rotor; a winding on said rotor effective for the excitation of said higher of said different numbers of pairs of poles; and a second winding on the rotor effective for either the excitation of said lower of said different number of pairs of poles or the excitation of said higher number of pairs of poles.

6. A three-phase multi-speed induction motor comprising; a stator; a three-phase winding on the stator adapted to provide excitation of a certain number of pairs of poles for medium speed operation or excitation of a lower number of pairs of poles for fast speed operation, with said certain number an even multiple of said lower number; a second three-phase winding on the stator adapted to provide excitation of a number of pairs of poles for slow speed operation which is greater than but indivisible by the number of pairs of poles for medium speed operation and is an odd multiple of the number of pairs of poles for fast speed operation; a rotor; a three-phase winding on the rotor of said certain number of pairs of poles for said medium speed operation, the coils of said phase wound winding being substantially full pitch; and a squirrel cage winding on the rotor for both said fast speed and said slow speed operation, said squirrel cage winding having conductors on the rotor, an end ring at one end of the rotor connecting said conductors, and jumpers at the other end of the rotor connecting in pairs conductors spaced to form substantially full pitch coils for said lower number of pairs of poles excitation.

7. A three-phase multi-speed induction motor comprising; a stator; a three-phase winding on the stator adapted to provide excitation of a certain number of pairs of poles for medium speed operation or excitation of a lower number of pairs of poles for fast speed operation, with said certain number an even multiple of said lower number; a second three-phase winding on the stator adapted to provide excitation of a number of pairs of poles for slow speed operation which is greater than but indivisible by the number of pairs of poles for medium speed operation and is an odd multiple of the number of pairs of poles for fast speed operation; a rotor having a certain number of slots; a three-phase winding on the rotor of said certain number of pairs of poles for said medium speed operation, the coils of said phase wound winding being substantially full pitch for said certain number of pairs of poles excitation, and each slot containing one side of one coil and the other side of another coil on top thereof to form a double layer winding; and a squirrel cage winding on the rotor for both said fast speed and said slow speed operation, said squirrel cage winding having conductors in the same slots as the phase wound winding, one conductor per slot, an end ring at one end of the rotor connecting said conductors, and jumpers at the other end of the rotor connecting in alternate pairs conductors spaced to form substantially full pitch coils for said lower number of pairs of poles excitation.

JACOB DANIEL LEWIS.

REFERENCES CITED

The following references are of record in the file of this patent:

UNITED STATES PATENTS

| Number | Name | Date |
|---|---|---|
| 660,909 | Lamme | Oct. 30, 1900 |
| 1,356,934 | Macmillan | Oct. 26, 1920 |
| 1,396,579 | Isono | Nov. 8, 1921 |
| 1,552,385 | Macmillan | Sept. 1, 1925 |
| 1,748,078 | Prantl | Feb. 25, 1930 |